July 5, 1938.  W. H. FOSTER  2,122,566
WINDSHIELD
Filed April 10, 1936
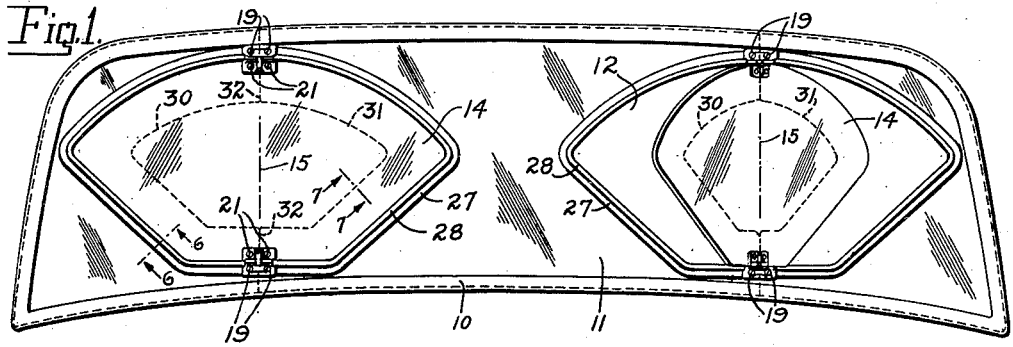
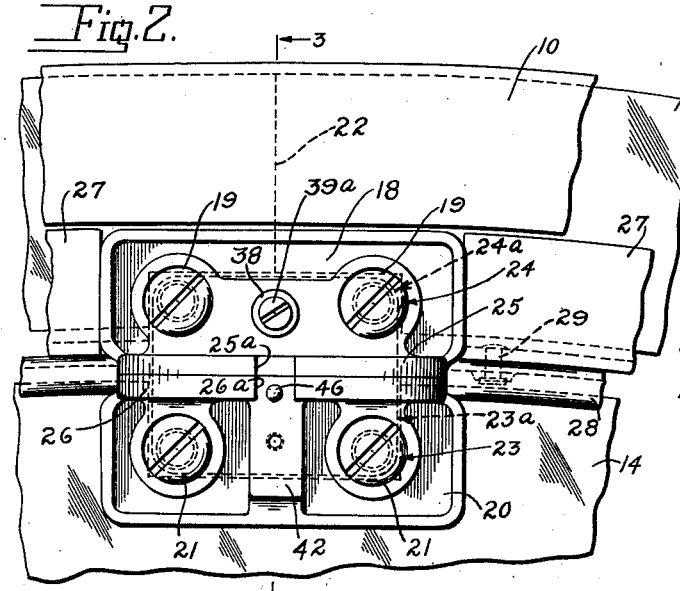
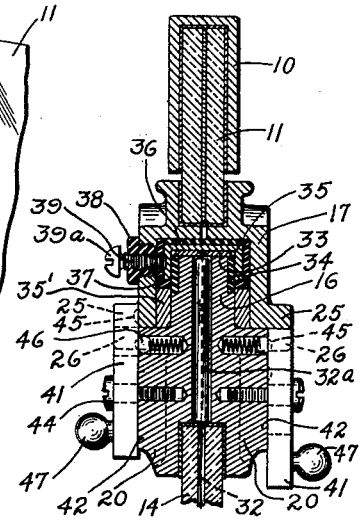
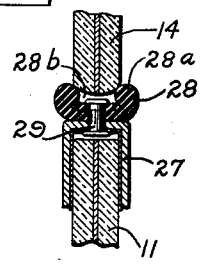
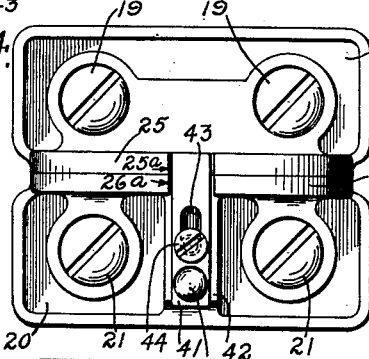
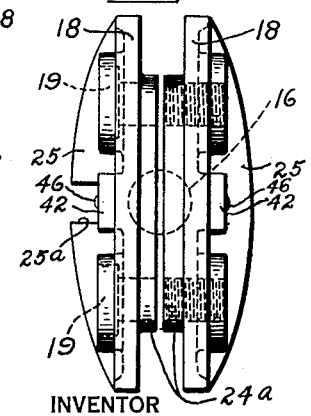
INVENTOR
William H. Foster,
BY
ATTORNEY Patented July 5, 1938

2,122,566

UNITED STATES PATENT OFFICE 2,122,566

WINDSHIELD

William H. Foster, Norwalk, Conn., assignor, by direct and mesne assignments, of ten per cent to Morton Weiss, Bridgeport, Conn., and ninety per cent to Rose G. Foster, Norwalk, Conn.

Application April 10, 1936, Serial No. 73,711

18 Claims. (Cl. 296—84)

This invention relates to windshields, and while the invention has been made with the idea of providing an improved windshield for automobile road vehicles, such as pleasure cars, trucks, buses, and the like, in a broader aspect the invention aims to provide a novel and valuable windshield for use in any desired relation, as, for instance, on airplanes, watercraft, or any conveyance on which the installation of a windshield is useful. Windshields are usually of glass, and glass herein will be referred to as the material of which the exemplifying embodiment of the invention is constructed; but it will be understood that whenever glass is referred to herein, there is meant any suitable and preferably transparent substitute therefor.

An object of the invention is to provide a glass panel for forming part of the windshield but adjustable relative to the main glass body of the windshield, hereinafter called the windshield glass, in such manner that the operator of the conveyance, as the driver of an automobile, can reverse the surface of the panel to allow him to clean its outside surface from the inside while driving. As the invention is preferably carried out, this object is attained by providing a windshield glass having a subdivision thereof constituting said panel, which is symmetrical about a vertical center line and which is rotatable about a vertical axis containing such center line, whereby either face of such subdivision can be aligned or placed into parallelism with the inner or the outer face of the windshield glass, in either case to close the opening within which said subdivision is mounted. Preferably, in accordance with present safety practice, and for another purpose which will appear hereinafter, nonshatterable glass is employed for said subdivision or panel, as well as for the windshield glass. Also, preferably, the glass used for the panel is of substantially the same thickness as the windshield glass; so that in either of the panel positions where it is aligned with the windshield glass, both the inner and outer surfaces of the windshield glass will be flush, respectively, with the inner and outer surfaces of the panel. Also, preferably, the panel is substantially fan-shaped, or shaped like a segment of an annulus, so as to correspond in outline approximately to the field of sweep of a pivotally mounted windshield wiper the point of pivotal mounting of which is in the line of pivotal mounting of the panel.

When such an arrangement is provided, various other objects of the invention are attained. Thus, when the wiper is operating, and the panel is in either of its adjustments in parallelism with the windshield, it is the outer surface of the panel which is subjected to the action of the wiper, and the vision of the driver through the panel is the same that he would obtain through the windshield were the panel not present. When, however, the wiped surface of the panel becomes splashed with mud or muddy water, as from road puddles entered by passing vehicles, the panel can be rotated to reverse its surfaces and place its splashed surface on the inside so that the latter can be cleaned by a cloth or the like. This is important, to avoid continued wiper travel after mud or muddy water has been deposited on the panel, and so to avoid scratching of the glass surface by grit particles in the mud or muddy water. Whether or not a windshield wiper is employed, various foreign deposits are received by a windshield at its outer surface at the portion through which the driver gazes ahead, and which deposits, such, for instance, as the mud or muddy water aforesaid, or a coating of sleet, or an oil splash, should be immediately removed because obscuring the driver's view. These view-obscuring deposits on the outer surface of the windshield occur most frequently in inclement weather. With the panel of the present invention, however, such deposits are removed from within the vehicle. The panel is merely swung through 180° to place the surface of the panel carrying the view-obscuring deposit at the inside, and then, following the removal of such deposit, the panel is given another 180° rotation so as once more to reverse its surface. Thus, the part of the windshield which most needs to be maintained clean on the outside, in order to give the driver the proper view ahead, can be easily and quickly cleaned, as often as required and regardless of the nature of the foreign deposit thereon, without leaving the vehicle. When a windshield wiper is employed, such a reversal of the panel can be readily accomplished despite the fact that the field of sweep of the wiper is desirably within the bounds of the pane; as when a wiper is present, for acting on the outer surface of the panel when the latter is arranged parallel with the outer surface of the windshield, such wiper is conveniently pivotally mounted beyond the bounds of the panel. With the wiper thus mounted, swinging of the panel through even a full revolution about its own pivotal mounting can be prepared for merely by first partially opening the panel and then manually swinging the wiper arm beyond the panel-accommodating opening in the windshield.

Another object of the invention is to provide, in a windshield and panel combination, and one preferably as above, a pivotal mounting for the panel such that the latter can be not only reversed as already described, each time by rotation through 180°, but can be given any other desired angular adjustment, as, for instance, one corresponding to a swing of 90° from its position of parallelism with the windshield, for use say when a heavy mist or fog lies ahead, or one of any desired angles to the plane of the windshield, for use say to ventilate the conveyance and at the same time to deflect away from the driver a draft of incoming air or otherwise to control such draft; yet a pivotal mounting such that the panel will be frictionally yet securely held in any position to which at any time it may happen to be adjusted. According to the invention, this object is preferably obtained by employing draft means for giving the required frictional grip of a socket element for a pintle or equivalent element of the pivotal mounting for the panel, while so placing these pivoted parts on the glass parts as securely to anchor the pivoted parts in their intended position yet to protect the glass parts against cracking or other injury.

Another object is to provide, in a windshield and panel combination incorporating certain or all of the features aforesaid, a means for impositively yet securely holding the panel in either of its two positions wherein it is adjusted into parallellism with the windshield, and which means, at the same time, then gives a waterproof joining between the panel and the windshield all around the former. According to the preferred way of carrying out the invention in this regard, the edges of the panel are transversely convexly rounded, and a resilient and preferably a rubber liner runs around the panel-accommodating opening in the windshield, said liner preferably having a longitudinal groove established between a pair of transversely convexly rounded beads. Such sealing means for the panel, when the latter is arranged in the plane of the windshield, preferably extends all the way to both the upper and lower hinge mounts for the panel, and, to attain another object of the invention, these hinge mounts incorporate relatively slidable surfaces which are always in water-tight contact and which when the panel is closed seal the only two gaps in the panel opening not sealed by the sealing means including the rubber liner or an equivalent.

A sealing means of the kind last-described is preferred and recommended, as the same is compact, offers the least possible view-blocking, and does not materially thicken the windshield around the panel; thus giving maximum attractiveness as well as efficiency to the general ensemble, and at the same time permitting the glass of the panel to be of the same thickness as that of the windshield, and, further, allowing a standard type of pivotally mounted windshield wiper to be employed, whenever desired, as hereinabove explained.

Another object of the invention is to provide a panel reversibly swingable about a vertical axis in an opening in a windshield to and from parallellism with the plane of the latter, which panel also carries an inbuilt electrical defroster. According to this feature of the invention as preferably carried out, a resistance heating wire is in the body of the glass of the panel, and leads thereto are attained by way of metallic parts of one or both of the upper and lower pivots. When nonshatterable glass is employed, as is preferred, this heating wire can be conveniently placed in grooves formed in the inner layer of nonvitreous material characteristically participating in the make-up of nonshatterable glass as today fabricated.

Still another object of the invention is to provide, in a windshield and panel combination wherein the panel is reversibly swingable as last-described, a simple and efficient locking means readily made effective from the inside of the car, to prevent illicit opening of the panel for the purpose of obtaining access to the inner side of a locked door when the vehicle is parked and locked at its various doors.

Other features and advantages of the invention will hereinafter appear.

In the accompanying drawing, which illustrates a form of the invention as at present preferred:

Figure 1 is an elevational view showing the side of a windshield facing the interior of a conveyance, and constructed or equipped pursuant to the invention.

Fig. 2 is a similar view, on an enlarged scale, of certain parts as seen in Figure 1.

Fig. 3 is a vertical section taken on the line 3—3 of Fig. 2.

Fig. 4 is an elevation looking toward either the right or the left in Fig. 3; this view, when considered an elevation looking toward the right in Fig. 3, illustrating a locked part omitted from Fig. 2 to increase the clarity of the latter.

Fig. 5 is a top plan view of the parts shown in Fig. 4, with, however, said locked part and another like lock part shown in Fig. 3, omitted.

Fig. 6 is an enlarged fragmentary detailed section, taken on the line 6—6 of Figure 1.

Fig. 7 is a similar view, taken on the line 7—7 of Figure 1.

The windshield of the present invention, in the exemplary embodiment thereof illustrated in this drawing, is shown as an automobile windshield having a suitable framing 10, for holding in place a windshield glass 11.

At one or more desirable locations in said glass 11, the same is cut away to provide at each such location an opening 12 for a glass panel 14 pursuant to the invention. In other words, one or more such panels may be employed. In the present case, two such panels are shown as being present, one positioned ahead of the driver and the other ahead of the person seated beside him.

The windshield and also each panel is preferably made of nonshatterable glass, as indicated in the case of one of the panels in Figs. 3 and 7. These parts are preferably made of the same thickness of glass as shown.

Referring to either of the panels illustrated, the same, as well as the opening 12 therefor, is symmetrical on opposite sides of a vertical center line 15, and a pivotal mounting for the panel is provided which includes pivoting means at top and bottom points thereon.

The pivotal axis of said mounting lies in said center line, that is, the latter is coincident with the aligned axes of a pair of pintles 16, one upstanding from the top of the panel and the other dependent from the bottom of the panel.

These pintles are received, respectively, in two-part sockets, each having a socket half 17 formed integral with a plate or leaf extension 18. Thus, each socketing structure presents not only a split socket, but a bifurcated socket carrier adapted to straddle the windshield glass 11 and clamp the same therebetween, by draft means in the form of screws 19, at an upper or lower point along the periphery of the panel-accommodating opening 12. Each pintle 16 is part of a structure also including a bifurcated carrier adapted to straddle the panel at the proper upper or lower point thereon, such carrier including plate or leaf extensions 20 for lying on opposite sides of the panel and clamping the same therebetween by tightening screws 21.

Also, as shown, the windshield glass is parted along a vertical line 22 opposite said center line 15. Thus the windshield glass, as shown, is assembled in its framing from three component pieces.

It may be noted, referring to the socketing structure, that the leaf extensions 18 thereof do not, strictly speaking, provide a bifurcation or fork in the construction shown, since they are there portions of two separate parts, but they are herein referred to as bifurcations, for convenience, and actually with some aptness, when each socketing structure, after being assembled by means of screws 21, is considered as a complete structure.

The socketing structures are preferably constructed, as above described, to give maximum efficiency to tightening of the screws 21 so far as is concerned their functioning in varying as desired the frictional grip of each socket on the pintle 16 therein, thereby to allow the panel to be given any desired angular adjustment yet always to have the pivoting means adapted to hold the panel in that adjustment against casual or accidental displacement therefrom.

Before placing the panel 14 in its opening 12, the carrying structures for the panel 18 are clamped tightly in place on the top and bottom of the panel by the screws 21, the panel being provided with cut-outs 23 for the passage therethrough of the screw shanks. Then, because of cut-outs 24 in the windshield glass 11 at the top and bottom of the opening 12, the panel can be placed in said opening with the pintles 16 extending into the cut-outs last mentioned and the socketing structures can be readily assembled about these pintles as shown; the last operation conveniently being a tightening of the screws 19, the shanks of which screws pass through the cut-outs 24.

In order to provide for a water-tight joint at and in the vicinity of the upper and lower pivoting means when the panel is parallel with the plane of the windshield glass, each socketing structure is provided around the mouth of the socket therein with a plate 25 elongated in the direction of said glass plane, such plate being here shown as elliptical, and each pintle-carrying structure is provided around the root of the pintle with a similar plate 26. The surfaces of these plates which face each other in each pivotal means at the top and bottom of the panel are flat and finished to give a fine, smooth fit in a plane, say horizontal, perpendicular to the axial line common to the two pintles 16.

In order to provide for a water-tight joint all around the periphery of the opening 12 beyond said plates 25 and 26, said opening is here shown as provided with a framing comprising a metal channel 27 carrying a shaped rubber strip 28, such strip riveted at suitable intervals to the panel as indicated at 29. The strip is so shaped cross-sectionally as to present a pair of elongate ribs or beads 28a, transversely rounded at their crests, and establishing therebetween an elongate groove 28b. At the same time, the edges of the panel 14 are transversely rounded as shown. Thus, when the panel is in the plane of the windshield glass, with either of the panel surfaces at the outside of the windshield, the panel is impositively but securely detained in place and at the same time the parts just described combine with the engaging plates 25 and 26 of the upper and lower pivotal means to seal the entirety of the periphery of the opening 12 in a water-tight manner. Nevertheless, but very slight hand pressure is required on either end of the panel at the inside surface thereof to swing the panel out of parallelism with the windshield glass, to rotate the panel through 180° to reverse its surfaces, or to give the panel any angular adjustment required with regard to the plane of the windshield.

Some of the various utilities thus obtainable have been hereinabove explained.

The rounding of the edges of the panel 14, already referred to, is a relatively inexpensive operation, and is a preferred feature, in combination with the rubber strip 28 or an equivalent when the strip is carried by the opening 12, as such edge rounding and such strip coact to provide not only the impositive detent above mentioned, but also to make opening and closing of the panel relative to the opening 12 a relatively easy operation, and, also, to increase the efficiency of the water seal. Should the strip 28 or an equivalent be applied to the panel edges, a transverse rounding of the corresponding edges of the opening 12 is, for similar reasons, preferred. It has already been stated that both the windshield glass 11 and the panel 14 are preferably made of nonshatterable glass. A favored edge finish for such glass is a transverse rounding, to minimize the initiation of cleavages therein between the different laminae thereof.

Reverting to the parting of the windshield glass 11 at the line 22, that is, along a preferably vertical line preferably located medially of the opening 12, this is for the purpose of facilitating the cutting-out of such opening when the transparent element 11 is made of nonshatterable glass, and such glass is of the type including a central lamina of nonvitreous material, and the opening is cut out after the nonshatterable glass has been fabricated from such a central lamina and a pair of sandwiching sheet-glass laminae. It has been found that it is easy to cut even an irregularly curved opening out of such nonshatterable glass if a considerable part of the opening extends to an edge of the glass; the procedure being to scribe by diamond-point the outline of the opening on each outside glass lamina, and then snap free the portions of the latter to be removed in making the desired opening, whereupon the thereby exposed portion of the nonvitreous central lamina can be sawed out.

In order that when a windshield wiper of the generally favored arcuately sweeping type is employed, the squeegee leaf of the wiper arm can act over the outside surface of the panel when the latter is parallel with the windshield, the panel is desirably fan-shaped, being here shown as conforming in outline to a segment of an annulus with converging ends. In the present case, these ends are shown downwardly converging, on the assumption that the pivoting point for the swing arm of the wiper (not shown) would be located at a point on the windshield below the panel, which point would most advantageously be substantially vertically below the pintle 16, and conveniently in the framing 10.

At 30 and 31 are indicated two electrical resistance wires, embedded in the glass panel 14, thereby to make of such panel an electric defroster. One or any number of such wires, arranged in any way desired, may be thus embedded. Referring again to the nonshatterable glass preferred to be used, such glass offers a convenient means for positioning said wire or wires in the body of the glass, especially when the wire elements employed are set in grooves 14a in the central nonvitreous sheet before both the outer or one of the outer glass sheets is laminated to the central sheet.

The wires 30 and 31 are here shown as joined near the top and bottom of the panel 12, where a single lead 32 passes through a pintle 16, such pintle being axially bored. The pivotal means at the top and the bottom of the panel are desirable externally and principally metal, as brass, and are electrically conductive. In order always to maintain the wires 30 and 31 properly in circuit with a suitable current supply source (not shown), each lead 32 is in the present case insulated by a sleeve 32a of so-called spaghetti, and then is connected to a cap-piece 33 on the pintle insulated from the remainder thereof by a sleeve 34 of fibre, hard rubber or other suitable insulating material. Aside from this sleeve, all parts of the pintle and its carrying structure, as here embodied, are of metal. Referring next to either socketing structure, as here embodied, the main parts of this, and also a contained cup 35 and a contained bearing collar 35', are likewise of metal. Such cup is confined within the main body of the socketing structure between a disk 36, and a sleeve 37 internally peripherally flanged as shown, these last two parts being of fibre, hard rubber or other suitable insulating material. Also of suitable insulating material is a bushing 38, and through this bushing a metal screw 39 is threaded, such screw having a head 39a for the attachment of a suitable connection to battery or ground, and at its other end being extended through the cylindrical wall of the insulation sleeve 37 to have its tip contact the exterior of the metal cup 35. According to these arrangements, the defroster can be electrically energized whenever a suitable switch (not shown) positioned in the circuit including said connections to the screws 39, is closed, regardless of the adjustment or adjusting movements of the panel in or toward or away from the plane of the windshield.

In order to permit assemblage of the pivotal means at the top and bottom of the panel 14 as hereinabove described, all these parts 35, 35', 36 and 37 are strung as shown on their pintle 16 preparatory to coupling together the two parts of the associated socketing structure.

In each pivotal means, the bifurcated portions of the pintle-carrying structure and also of the socket-carrying structure are provided with bosses, those in the socket-carrying structure marked 23a and those in the pintle-carrying structure marked 24a, for respectively entering the cut-outs 23 in the panel 14 and the cut-outs 24 in the windshield glass 11.

In order to provide means, effective when the vehicle is parked and located at its various doors, for preventing illicit opening of the panel for the purpose of obtaining access to the release latch on the inner side of a locked door, a means for locking the panel into parallellism with the plane of the windshield is provided, and here shown as including a vertically endwisely slidable flat bar 41 mounted on a suitable pad 42 formed on the socketing structure of each upper and lower pivotal means for the panel. This bar is slotted at 43, such slot engaging a guide stud forming part of a screw 44. This stud and a slot 26a in plate 26 of the socketing structure always hold the bar 41 to straight line travel. The undersurface of said bar has a pair of suitably spaced recesses 45, a different one of which is for engaging an impositive detent in the form of a spring-press ball 46, according as the bar is moved, by a finger-piece 47, either to locking or unlocking position relative to the panel. In Fig. 4, the bar 41 there seen is shown in locked position; while one of the bars 41 seen in Fig. 3 is shown in locked position and the other thereof is shown in unlocked position. Two such bars are provided, with all the attendant elements just described, at both sides of the socketing structure, so that whichever side of the panel 14 is parallel with the inner side of the windshield glass 11 at a time when it is desired to lock the panel, one of the bars 41 is movable to locked position from the inside of the vehicle. When such a bar is moved to locked position, its upper end enters a slot 25a in the plate 25 of the associated pintle-carrying structure, which slot 25a aligns with a slot 26a of the adjacent plate 26 when the panel is parallel with the windshield glass.

When a panel is thus locked, the bars 41 on the outside thereof cannot be manipulated because there is no slot 25a on the outer member 18 and hence the panel cannot be locked from the outside of the vehicle.

As the embodiment illustrated has been described, the pivotal means at the top and bottom of the panel have been deemed identical (so applied that whereas in the upper pivotal means the pintle 16 is upstanding, in the lower pivotal means such pintle is depending); and in accordance with such description, locking means have been described as at both the top and bottom of the panel. But, as will be understood, a single locking means may suffice, as one at either the top or bottom of the panel.

It will be seen from the foregoing detailed description of that one of the many possible ways of carrying out the invention now preferred, that an embodiment thereof has been provided which is practicable, comparatively inexpensive, capable of many diverse and practically valuable utilities, and one well calculated to attain all the various objects and afford all the various advantages hereinabove mentioned.

Particularities of description or emphasis are not to be taken as intended to limit the invention, but solely as explanations of present preferences in connection with the embodiment illustrated and with the aim to make the fullest, clearest and most exact disclosure of the invention as now understood. The scope of protection, consequently, is to be taken solely from the claims following. Therefore, variations and modifications may be made within the scope of this invention, and portions of the improvements may be used without others.

I claim:

1. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center line, and means for sealing the panel in its opening in a water-tight manner when the panel is arranged substantially parallel with the windshield glass, said means including a structure parts of which are formed of resilient material, said structure carried by one of said panels and said opening and including elongate beads establishing between them an elongate channel.

2. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center line, each of said pivoting means including a pintle and a bifurcated carrier therefor, a socket for the pintle and a bifurcated carrier therefor, and draft means for tightly mounting said carriers one on the windshield glass and one on the panel.

3. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center line, each of said pivoting means including a pintle and a bifurcated carrier therefor, a plural part socketing structure for the pintle including two parts each presenting a portion of such socket and together providing a bifurcated carrier therefor, and draft means for mounting said carriers one on the windshield glass and one on the panel, whereby tightening said draft means causes a predetermined frictional grip by such socket on said pintle.

4. A windshield as in claim 8, wherein the windshield glass is parted substantially along said center line.

5. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center line, the windshield glass being parted substantially along said center line, each of said pivoting means including a two-part structure, the parts of which are applied respectively to the two opposite sides of the windshield glass, there also being provided clamping means for coupling and mounting said parts, said coupling means crossing the plane of the windshield glass.

6. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center line, the windshield glass being parted substantially along said center line, each of said pivoting means including a pintle and a bifurcated carrier therefor straddling the panel, and also a plural part socket structure for the pintle including two parts each presenting a portion of such socket and together providing a bifurcated carrier straddling the windshield glass, there being draft means for tightening said bifurcated carriers on the glass parts on which they are straddled, said glass parts having cutaway portions for the passage therethrough of parts of said draft means.

7. In a windshield, in combination, a windshield glass having an opening therein, a glass panel conforming generally to the outline of said opening, said opening being symmetrical on opposite sides of a vertical center line, a pivotal mounting for the panel including pivoting means at top and bottom points on the same, the pivotal axis of such mounting lying substantially in said center, and a lock partially carried by one of said pivoting means.

8. In a vehicle window, in combination, a window glass having an opening therein, a glass panel conforming generally to the outline of said opening and substantially as thick as the window glass, said opening being symmetrical on opposite sides of a vertical center line, and a pivotal mounting for mounting the panel in the opening in the window including pivoting means at top and bottom points on the same, the pivotal axis of such mounting lying substantially in said center line and said pivoting means being such that the symmetrical panel may be rotated through at least 180° to reverse the faces of the panel relative to the faces of the window glass.

9. In a vehicle window, in combination, a window glass having substantially a fan-shaped opening therein, a glass panel having an outline conformed generally to the shape of said opening and substantially as thick as the window glass, said opening being symmetrical on opposite sides of a vertical center line, and a pivotal mounting for mounting the panel in the opening in the window including pivoting means at top and bottom points on the same, the pivotal axis of such mounting lying substantially in said center line and said pivoting means being such that the symmetrical panel may be rotated through at least 180° to reverse the faces of the panel relative to the faces of the window glass.

10. In a vehicle window, in combination, a window glass having an opening therein, a glass panel conforming generally to the outline of said opening, said opening being symmetrical on opposite sides of a vertical center line, a pivotal mounting for the panel including pivoting means at top and bottom points in the same, the pivotal axis of such mounting lying substantially in said center line, and means for sealing the panel in its opening in a water-tight manner when the panel is arranged substantially parallel with the window glass, said sealing means including an elongate structure including laterally spaced ribs having crests transversely rounded.

11. In a vehicle window, in combination, a window glass having an opening therein, a glass panel conforming generally to the outline of said opening, said opening being symmetrical on opposite sides of a vertical center line, a pivotal mounting for the panel including pivoting means at top and bottom points in the same, the pivotal axis of such mounting lying substantially in said center line, and means for sealing the panel in its opening in a water-tight manner when the panel is arranged substantially parallel with the window glass, said sealing means including an elongate structure including laterally spaced flexible rubber ribs shaped to engage the edge of the panel and seal the same but to allow the panel to be readily moved out of substantial parallel relation if desired.

12. In a vehicle window, in combination, a window glass having an opening therein, a glass panel conforming generally to the outline of said opening, said opening being symmetrical on opposite sides of a vertical center line, a pivotal mounting for the panel including pivoting means at top and bottom points in the same, the pivotal axis of such mounting lying substantially in said center line, and means for sealing the panel in its opening in a water-tight manner when the panel is arranged substantially parallel with the window glass, said sealing means including an elongate structure including laterally spaced ribs having crests transversely rounded, said structure being mounted along an edge of one of said panels and opening, said means also including transverse edge roundings on that one of said panel and said opening other than the one carrying said structure.

13. In a vehicle window, the combination of a window glass having an opening therein; a glass panel conforming to the general outline of said opening; means for mounting the glass panel in the opening in the window glass so that it lies in the plane of the window glass, said mounting means including a pivotal mounting arranged so that the glass panel pivots about a vertical axis; and means for locking the glass against movement out of the plane of the window glass.

14. In a vehicle window, the combination of a window glass having an opening therein; a glass panel conforming to the general outline of the opening; means for mounting the glass panel in the opening in the window so that it lies in the plane of the window glass, said mounting means including a pivotal mounting arranged so that the glass pivots about a vertical axis, the edges of the glass panel being rounded; and means carried by the window glass for cooperating with the rounded edges and sealing the panel in a watertight manner when the panel is arranged to lie in the plane of the window glass.

15. In a vehicle window, the combination of a window glass having an opening therein; a glass panel conforming to the general outline of the opening, means for mounting the glass panel in the opening in the window so that it lies in the plane of the window glass, said mounting means including a pivotal mounting arranged so that the glass pivots about a vertical axis, the edges of the glass panel being rounded; and means carried by the window glass for cooperating with the rounded edges and sealing the panel in a watertight manner when the panel is arranged to lie in the plane of the window glass, said means including spaced flexible coacting elements shaped to cooperate with the rounded edges to impositively hold the panel in the plane of the window glass.

16. In a vehicle window, the combination of a window glass having an opening therein; a glass panel conforming to the general outline of the opening, means for mounting the glass panel in the opening in the window so that it lies in the plane of the window glass, said mounting means including a pivotal mounting arranged so that the glass pivots about a vertical axis, the edges of the glass panel being rounded; and means carried by the window glass for cooperating with the rounded edges and sealing the panel in a watertight manner when the panel is arranged to lie in the plane of the window glass, said means including spaced resilient elements shaped to engage the rounded edges of the panel in the plane of the window glass.

17. In a vehicle window, the combination of a window glass having an opening therein; a glass panel conforming to the general outline of said opening; means for mounting the glass panel in the opening in the window panel so that it lies in the plane of the window glass, said mounting means including a pivotal mounting arranged so that the glass panel pivots on a vertical axis; and means for heating the glass panel to keep ice from forming on the same so as to prevent it from being moved about its pivotal axis.

18. In a windshield, the combination of a windshield glass having an opening therein; a glass panel conforming to the general outline of said opening; means for moving the glass panel in the windshield panel so that it lies in the plane of the opening in the windshield glass, said mounting means including a pivotal mounting arranged so that the glass panel pivots on a vertical axis; and means for heating the glass panel to keep ice from forming on the same so as to prevent it from being moved about its pivotal axis, comprising resistance wires embedded in the glass panel and connected to a source of electrical energy for energization.

WILLIAM H. FOSTER.

CERTIFICATE OF CORRECTION.

Patent No. 2,122,566.                        July 5, 1938.

WILLIAM H. FOSTER.

It is hereby certified that error appears in the printed specification of the above numbered patent requiring correction as follows: Page 6, second column, line 41, claim 18, strike out the words "opening in the" and insert the same before "windshield" in line 40, same claim; and that the said Letters Patent should be read with this correction therein that the same may conform to the record of the case in the Patent Office.

Signed and sealed this 30th day of August, A. D. 1938.

Henry Van Arsdale

Acting Commissioner of Patents.

(Seal)